(12) United States Patent
Williams

(10) Patent No.: US 9,357,609 B2
(45) Date of Patent: May 31, 2016

(54) LIGHTING DEVICE

(75) Inventor: Nicolas Williams, Knighton (GB)

(73) Assignee: LITONICS LIMITED, Knighton, Powys (GB)

( * ) Notice: Subject to any disclaimer, the term of this patent is extended or adjusted under 35 U.S.C. 154(b) by 170 days.

(21) Appl. No.: 14/009,028

(22) PCT Filed: Mar. 28, 2012

(86) PCT No.: PCT/GB2012/050693
§ 371 (c)(1),
(2), (4) Date: Sep. 30, 2013

(87) PCT Pub. No.: WO2012/131366
PCT Pub. Date: Oct. 4, 2012

(65) Prior Publication Data
US 2014/0015423 A1    Jan. 16, 2014

(30) Foreign Application Priority Data

Mar. 31, 2011 (GB) .................................. 1105512.6
Aug. 12, 2011 (GB) .................................. 1113940.9

(51) Int. Cl.
*H05B 37/00* (2006.01)
*H05B 33/08* (2006.01)
(Continued)

(52) U.S. Cl.
CPC .............. *H05B 33/0848* (2013.01); *H02J 3/14* (2013.01); *H05B 33/0815* (2013.01);
(Continued)

(58) Field of Classification Search
CPC .... H05B 37/0272; H05B 37/02; H05B 37/03; H05B 33/0848

USPC ............. 315/161, 160, 86, 88, 246, 274, 276, 315/291, 165, 166, 175, 176
See application file for complete search history.

(56) References Cited

U.S. PATENT DOCUMENTS 4,323,820 A  4/1982  Teich
4,454,452 A  6/1984  Feldstein
(Continued)

FOREIGN PATENT DOCUMENTS

DE  20 2010 005 615 U1  11/2004
EP  2 163 808  3/2010
(Continued)

OTHER PUBLICATIONS

International Search Report for International Application No. PCT/GB2012/050693 mailed Sep. 19, 2012.
(Continued)

*Primary Examiner* — Lincoln Donovan
*Assistant Examiner* — Thomas Skibinski
(74) *Attorney, Agent, or Firm* — Merchant & Gould P.C.

(57) ABSTRACT

A lighting device has one or more light sources; a primary input power connection; and electronic circuitry for controlling delivery of power from the primary input power connection to the one or more light sources. The electronic circuitry determines an indication of an external electrical loading on a primary power supply network coupled, in use, with the primary input power connection the circuitry varies the power drawn from the primary input power connection in dependence upon the determined indication of the external electrical loading on the primary power supply network. In this way, during times of high demand on the primary supply network, the lighting device can reduce the amount of power drawn from the primary supply.

21 Claims, 8 Drawing Sheets

(51) Int. Cl.
*H05B 37/02* (2006.01)
*H02J 3/14* (2006.01)

(52) U.S. Cl.
CPC ....... *H05B 33/0845* (2013.01); *H05B 37/0209* (2013.01); *H05B 37/0263* (2013.01); *H02J 2003/143* (2013.01); *Y02B 70/3225* (2013.01); *Y02B 70/3283* (2013.01); *Y04S 20/222* (2013.01); *Y04S 20/246* (2013.01)

(56) References Cited

U.S. PATENT DOCUMENTS

| | | | |
|---|---|---|---|
| 4,636,910 | A | 1/1987 | Chadwick |
| 4,727,291 | A | 2/1988 | Bavaro |
| 4,977,351 | A | 12/1990 | Bavaro et al. |
| 5,233,273 | A | 8/1993 | Waki et al. |
| 5,451,843 | A | 9/1995 | Kahn et al. |
| 5,734,229 | A | 3/1998 | Bavaro et al. |
| 6,045,232 | A | 4/2000 | Buckmaster |
| 6,097,108 | A | 8/2000 | Tweed |
| 6,168,282 | B1 | 1/2001 | Chien |
| 6,376,932 | B1 | 4/2002 | Yang |
| 6,380,693 | B1 | 4/2002 | Kastl |
| 6,452,217 | B1 | 9/2002 | Wojnarowski et al. |
| 6,876,159 | B1 | 4/2005 | Wu et al. |
| 7,102,295 | B2 | 9/2006 | Chen |
| 7,952,303 | B2 | 5/2011 | Xiong et al. |
| 8,232,746 | B2 | 7/2012 | Yufuku et al. |
| 2003/0006709 | A1 | 1/2003 | Tabell |
| 2003/0141819 | A1 | 7/2003 | Cojocary |
| 2004/0012959 | A1 | 1/2004 | Robertson et al. |
| 2004/0264187 | A1 | 12/2004 | Vanderschuit |
| 2005/0265035 | A1 | 12/2005 | Brass et al. |
| 2006/0193131 | A1 | 8/2006 | McGrath et al. |
| 2007/0189001 | A1 | 8/2007 | Nielson et al. |
| 2007/0200433 | A1 | 8/2007 | Kelty |
| 2007/0247840 | A1 | 10/2007 | Ham |
| 2008/0030140 | A1 | 2/2008 | Pape et al. |
| 2008/0088180 | A1 | 4/2008 | Cash et al. |
| 2008/0175216 | A1 | 7/2008 | Nasco |
| 2008/0203937 | A1 | 8/2008 | Hooijer et al. |
| 2008/0203939 | A1 | 8/2008 | Pekarshi et al. |
| 2008/0222431 | A1* | 9/2008 | Paniagua et al. ............... 713/300 |
| 2008/0304249 | A1 | 12/2008 | Davey et al. |
| 2008/0316755 | A1 | 12/2008 | Zheng et al. |
| 2009/0152952 | A1 | 6/2009 | Evans, Sr. |
| 2009/0161356 | A1 | 6/2009 | Negley et al. |
| 2009/0175041 | A1 | 7/2009 | Yuen et al. |
| 2010/0133578 | A1 | 6/2010 | Pickard et al. |
| 2010/0135000 | A1 | 6/2010 | Smith, III et al. |
| 2010/0176743 | A1 | 7/2010 | Lee et al. |
| 2010/0194277 | A1 | 8/2010 | Yoo |
| 2010/0244719 | A1* | 9/2010 | Mans ........................... 315/246 |
| 2010/0270861 | A1 | 10/2010 | Chen |
| 2010/0327766 | A1* | 12/2010 | Recker et al. ................. 315/291 |
| 2011/0057572 | A1 | 3/2011 | Kit et al. |
| 2011/0068692 | A1 | 3/2011 | Tian et al. |
| 2011/0128742 | A9 | 6/2011 | Yuen et al. |
| 2011/0163672 | A1 | 7/2011 | Shew et al. |
| 2012/0001548 | A1 | 1/2012 | Recker et al. |
| 2012/0235492 | A1 | 9/2012 | Inoue et al. |
| 2015/0091451 | A1 | 4/2015 | Williams |

FOREIGN PATENT DOCUMENTS

| | | |
|---|---|---|
| EP | 2 384 087 | 9/2012 |
| GB | 2 447 495 | 9/2008 |
| GB | 2 455 107 | 6/2009 |
| GB | 2 466 790 | 7/2010 |
| GB | 2 483 113 | 2/2012 |
| GB | 2 489 505 | 10/2012 |
| JP | 8-264010 | 10/1996 |
| JP | 2000-92717 | 3/2000 |
| JP | 2001-176680 | 6/2001 |
| JP | 2002-359087 | 12/2002 |
| WO | WO 01/71244 | 9/2001 |
| WO | WO 2005/045312 | 5/2005 |
| WO | WO 2006/030432 | 3/2006 |
| WO | WO 2006/064209 | 6/2006 |
| WO | WO 2007/004190 | 1/2007 |
| WO | WO 2008/124701 | 10/2008 |
| WO | WO 2009/017329 | 2/2009 |
| WO | WO 2009/067074 | 5/2009 |
| WO | 2010/043923 | 4/2010 |
| WO | WO 2010/070676 | 6/2010 |
| WO | WO 2010/090012 | 8/2010 |
| WO | WO 2010/099755 | 9/2010 |
| WO | WO 2010/127366 | 11/2010 |
| WO | WO 2011/014111 | 2/2011 |
| WO | WO 2011/042781 | 4/2011 |
| WO | WO 2012/013168 | 10/2012 |

OTHER PUBLICATIONS

International Search Report for International Application No. PCT/GB2013/051141 mailed Aug. 21, 2013 (2 pages).
International Search Report for International Application No. PCT/GB2012/050695 (2 pages).
Form PTO-892, issued in Notice of Allowance for co-pending U.S. Appl. No. 14/728,622, Nov. 27, 2015.
Panasonic Lithium Ion, Feature & Benefits, Version 13.11R1, Copyright 2012, Energy Company, http://industrial.panasonic.com/lecs/www-data/pdf2/ACI4000/ACI4000CE17.pdf , 1 page.
VARTA Rechargeable Lithium-Ion Cylindrical, Data Sheet, Jun. 9, 2010/RH 702507, VARTA Microbattery GmbH, http://www.varta-microbattery.com/applications/mb_data/documents/data_sheets/ds56621.pdf, one page.
Samsung SDI, Specification of Product for Lithium-ion Rechargeable Cell, Jan. 2005, Samsung SDI Co., Ltd., Mobile Energy Division, http://www.batteryonestop.com/baotongusa/products/datasheets/li-ion/Samsung-SDI-ICR18650-26A.pdf , 16 pages.
Steve McCluer, Wanted: Real World Battery Life Prediction Abstract, American Power Conversion Corporation (APC), http://www.battoon.com/papersfinal2003/mccluerpaperfinal2003.pdf, 8 pages.
Panasonic Nickel Cadmium Batteries, Technical Handbook '02/'03, PDF File Technical Handbook, Copyright 2002, Matsushita Battery Industrial Co., Ltd., http://media.digikey.com/pdf/Data%20Sheets/Panasonic%20Batteries%20PDFS/Ni%20Cd%20Catalog%202002-03%20v1.pdf , 87 pages.
Energizer Product Data Sheet, Energizer NH15-2300 Specifications, Form No. EBC-7102WB, http://data.energizer.com/PDFs/nh15-2300.pdf , 1 page.
Cree Product Family Data Sheet, Cree XLamp XM-L LEDs, CLD-DS33 Rev 10A, Copyright 2010-2015 Cree, Inc., http://www.cree.com/~/media/files/cree/led%20components%20and%20modules/xlamp/data%20and%20binning/xlampxml.pdf 14 pages.
Co-pending U.S. Appl. No. 14/728,622, filed Jun. 2, 2015 (76 pages).

* cited by examiner

LIGHTING DEVICE

This application is a National Stage Application of PCT/GB2012/050693, filed 28 Mar. 2012, which claims benefit of Serial No. 1105512.6, filed 31 Mar. 2011 in Great Britain and Serial No. 1113940.9, filed 12 Aug. 2011 in Great Britain and which applications are incorporated herein by reference. To the extent appropriate, a claim of priority is made to each of the above disclosed applications.

The present invention relates to lighting devices and in particular to lighting devices that have additional components and circuitry to enable the lighting device to control consumption of electrical power from one or more power supplies.

The present inventor has previously proposed (in GB 2447495) an electric lighting device having circuitry that can provide power to the lighting device from a backup battery rather than the mains supply if a mains failure (power outage) is detected. The present invention was made as a result of the inventor seeking to improve or modify this earlier lighting device to increase functionality.

SUMMARY OF INVENTION

According to one aspect, the invention provides a lighting control device comprising: a primary input power connection; a secondary input power connection; an output power connection; and electronic circuitry for controlling delivery of power from the primary and secondary input power connections to the output power connection; wherein the electronic circuitry comprises: means for determining an indication of an external electrical loading on a primary power supply network coupled, in use, with the primary input power connection; and means for varying the power drawn from the secondary input power connection in dependence upon the determined indication of the external electrical loading on the primary power supply network.

The means for varying the power drawn may also be arranged to vary the power drawn from the primary power connection in dependence upon the determined electrical loading on the primary input power connection. In a preferred embodiment, the means for varying the power drawn from the primary and secondary input power connections may be arranged to provide power to the output power connection so that the brightness of the one or more light sources remains substantially the same irrespective of the electrical loading on the primary supply network.

In one embodiment, the determining means is arranged to receive a signal from an external device indicative of the external electrical loading on the primary power supply network. The signal may be received from the primary power supply network, in which case, the signal may be modulated onto the power signal and the determining means will comprise a demodulator for demodulating the received signal.

The determining means may determine a measurement of the frequency of a power signal received at the primary input power connection and based on this frequency determine the loading on the supply network. This may provide an almost instantaneous or real-time indication of the supply network loading at the time that the measurement was made.

In this case, the electronic circuitry may further comprise: means for providing at least one threshold value; and means for comparing the threshold value to the measurement of the frequency of the power signal.

The varying means may decrease the power drawn from the primary input power connection when the determining means determines that there is a high electrical loading on the primary power supply network. For example, the varying means may decrease the power drawn from the primary input power connection by inhibiting operation of a charging circuit used to charge a secondary charge storage device associated with the lighting device. In addition or alternatively, the varying means may decrease the power drawn from the primary input power connection by reducing the brightness of light generated by the one or more light sources.

If desired, the lighting device may replace power drawn from the primary input power connection with power drawn from the secondary power supply associated with the lighting device. This secondary power supply may be provided primarily for purposes of powering the light sources to provide sustained illumination or for some other purpose.

In one embodiment, the varying means increases the power drawn from the primary input power connection when the determining means determines that there is a low electrical loading on the primary power supply network. This may be done, for example, by allowing operation of a charging circuit used to charge a secondary charge storage device associated with the lighting device. In addition or alternatively, this may be done by increasing the brightness of light generated by the one or more light sources.

The electronic circuitry may further comprise means for determining a remaining charge of the secondary power supply; and the varying means may be prevented from increasing power drawn from the secondary power supply if the charge determining means determines that the remaining charge of the secondary power supply is lower than a first charge value.

Where the secondary power supply comprises a charge storage device and the electronic circuitry further comprises means for determining a remaining charge of the charge storage device, the varying means may be arranged to vary the power drawn from the secondary power supply in dependence upon the remaining charge of the charge storage device.

Where the secondary power supply comprises a charge storage device, the varying means may be arranged to vary the power drawn from the secondary power supply in dependence upon the capacity of the charge storage device. Additionally or alternatively, during periods of high grid demand, the varying means may be arranged to draw power from the secondary power supply for a predefined time period. In this case, if the electronic circuitry comprises means for determining a remaining charge of the charge storage device, then the varying means may be arranged to reduce the power drawn from the secondary power supply during said period of time if the remaining charge of the charge storage device is below a threshold or if the secondary power supply has been used for a second period of time. Reduction of the power drawn from the secondary power supply may result in a reduction of brightness of the one or more light sources.

In one embodiment, the varying means is arranged to increase the power drawn from the primary power supply when it reduces the power drawn from the secondary power supply. Similarly, the varying means may be arranged to reduce the power drawn from the primary power supply when it increases the power drawn from the secondary power supply.

The means for determining an indication of an external electrical loading on a primary power supply network coupled, in use, with the primary input power connection may be arranged to measure one or more parameters of the primary input power signal (such as its frequency and/or voltage) to determine the real-time loading on the supply network.

The electronic circuitry may also comprise means for measuring an external impedance coupled, in use, to the primary input power connection and the varying means may be arranged to control power drawn from the secondary power supply in dependence upon the impedance measure. This may be for purposes of powering the light sources to provide sustained illumination or for some other purpose.

The varying means may also be configured to increase the power drawn from the secondary power supply when the power signal is not present at the primary input power connection and the impedance measure is below a predetermined threshold value.

In one embodiment, the determining means communicates using one of optical signal transducer, an acoustic signal transducer or an electromagnetic wave signal transducer.

One or more system element may be enclosed partially or wholly within a light bulb or elongate tube enclosure or similar transparent or translucent housing. Alternatively, the control circuitry may be mounted in an in-line adapter, a modified power supply unit or a ceiling rose type of adapter.

By automatically reducing consumption of power from the primary power connection during periods of high demand, faults with the electrical network can be minimised.

The lighting device may retro-fit any existing light fitting or wiring installation and may replace or augment any conventional lighting devices powered from the mains power supply.

These and other aspects of the invention will become apparent from the following description of exemplary embodiments which are described below with reference to the accompanying Figures in which.

Figure 3:
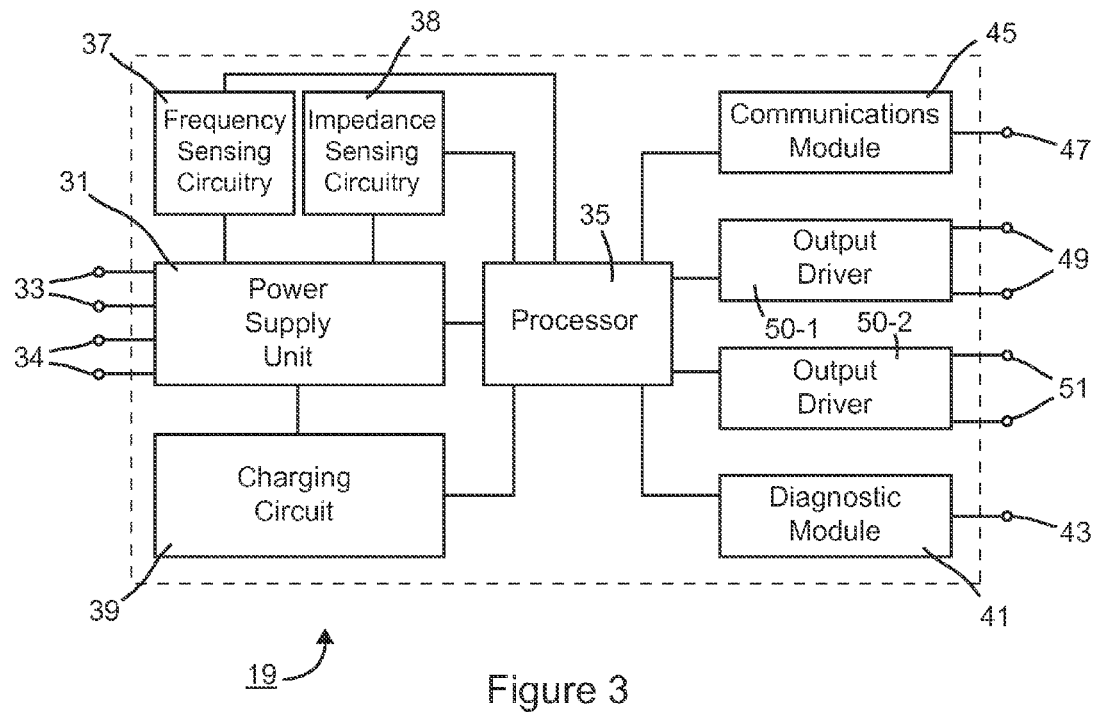
FIG. 3 is a block diagram illustrating the main components of electronic circuitry forming part of the lighting device shown in FIG. 1.
Figure 6:
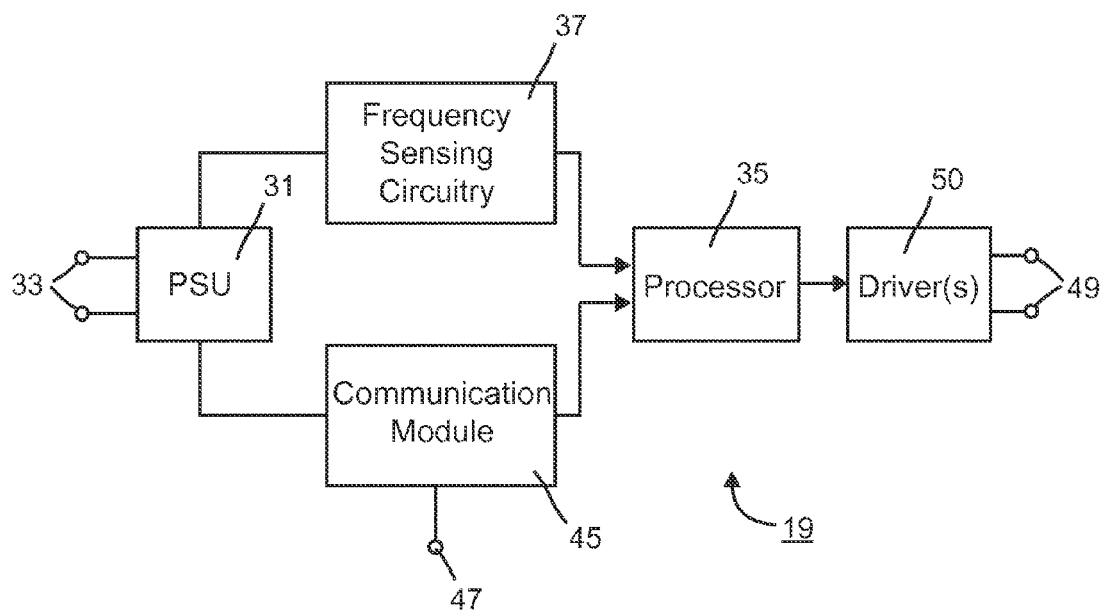
FIG. 6 is a block diagram illustrating alternative circuitry that may be provided in a second embodiment of a lighting device that does not have a secondary power supply.
Figure 8A:
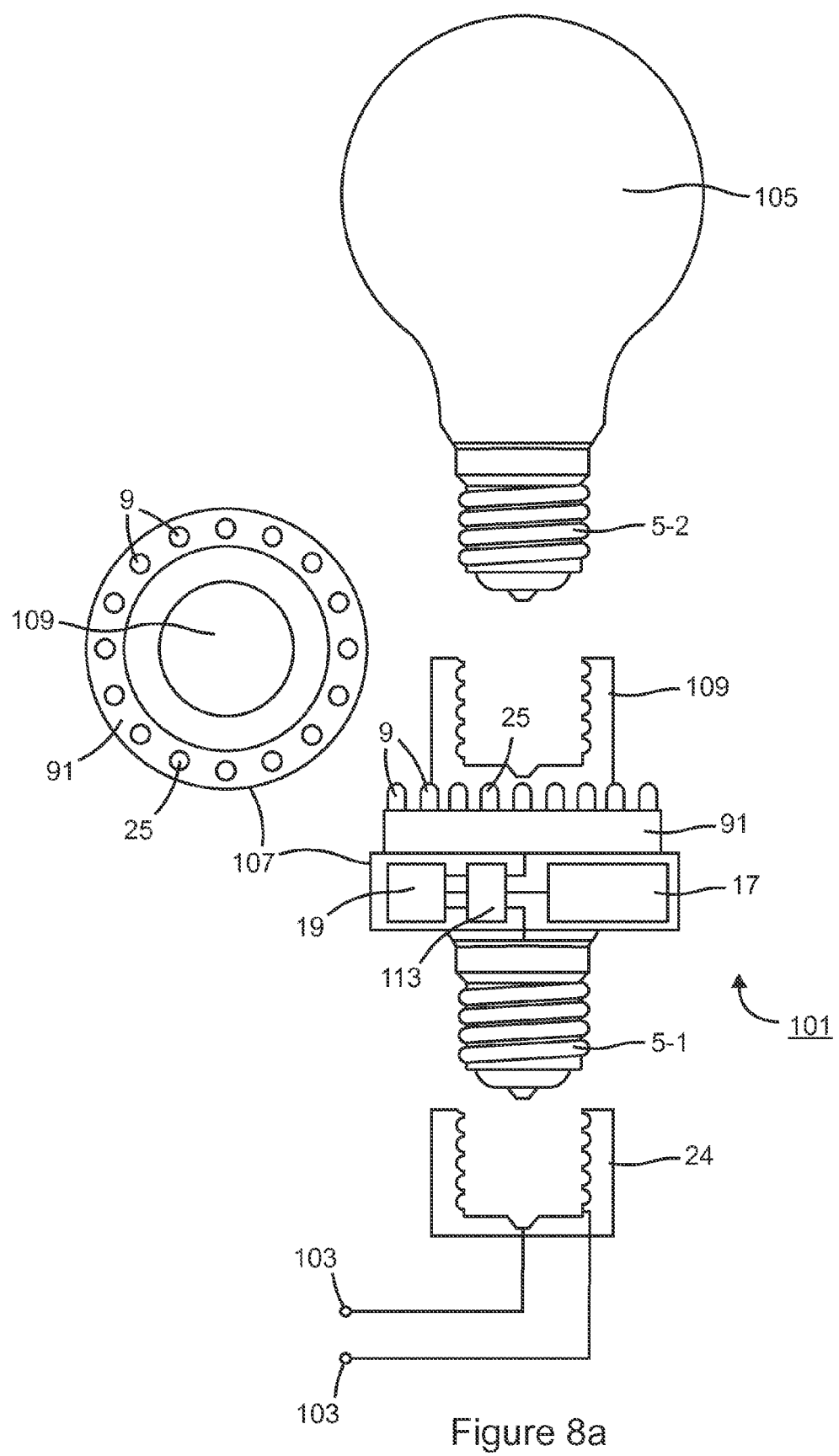
Figure 8B:
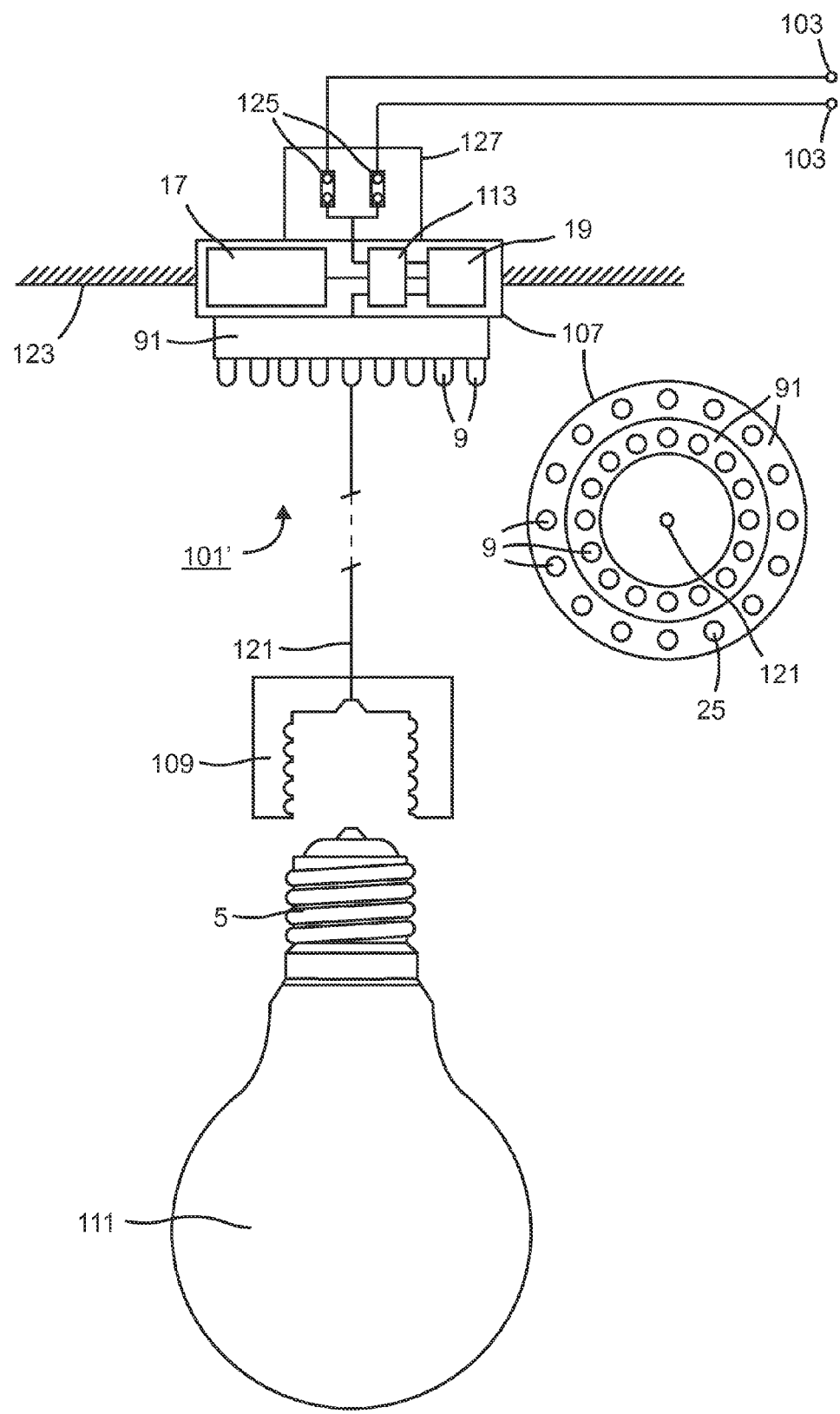
Figure 9:
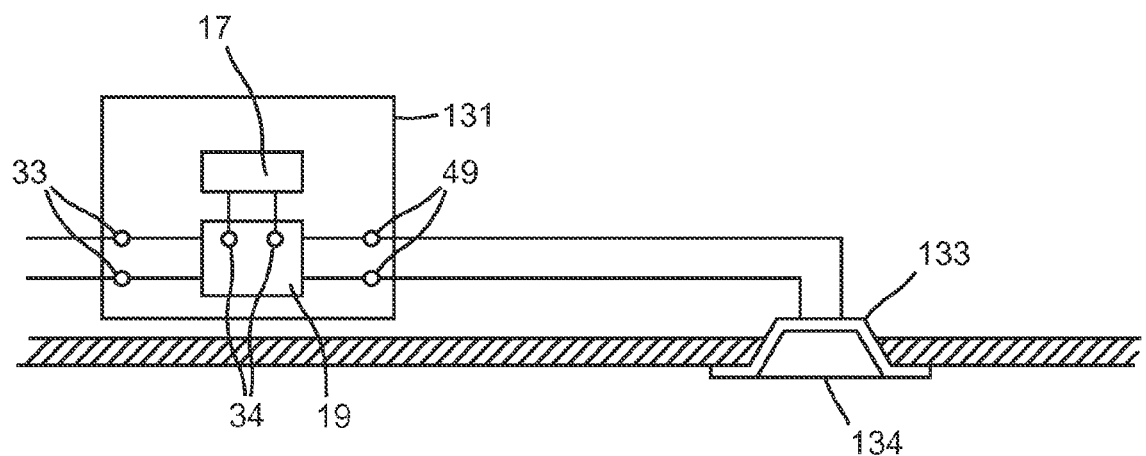

FIG. 8a schematically illustrates an in-line adapter that can be provided with the circuitry shown in FIG. 3 or FIG. 6;

FIG. 8b schematically illustrates a ceiling rose adapter that can be provided with the circuitry shown in FIG. 3 or FIG. 6; and FIG. 9 schematically illustrates a modified power supply unit that controls power delivery to one or more light sources and that has the circuitry shown in FIG. 3 or FIG. 6.

OVERVIEW

Figure 1:
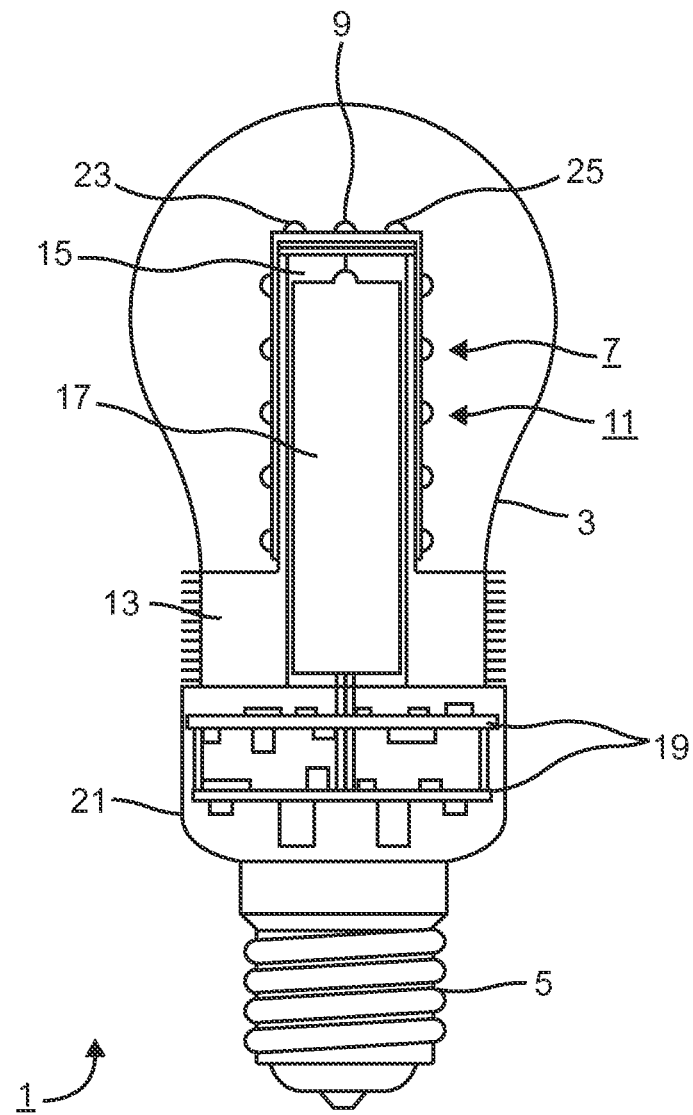
FIG. 1 is a schematic view of a lighting device for connection to a conventional light holder and wiring installation and which can control the delivery of power from a primary power supply to light sources within the lighting device.

FIG. 1 shows an example of a lighting device 1 embodying the present invention. In this instance, the lighting device 1 is in the form of a traditional look-a-like light bulb that has an optically transparent/translucent housing 3 that is mechanically coupled to a fitting 5. The fitting 5 is for connecting the lighting device 1 to a conventional light holder (in this case illustrated as a conventional screw type holder), which in turn connects the lighting device 1 to a primary power supply.

One or more light sources 7 are provided within the housing 3. In this embodiment, the light sources 7 include a plurality of light emitting diodes 9 that are arranged in one or more arrays 11 so that the lighting device 1 has a wide angle of illumination. To achieve optimum efficacy, efficiency and life span, the LED array(s) 11 are mechanically fixed and thermally connected to a heatsink 13. The structure and function of the heatsink 13 is described in the applicant's earlier GB application (GB 1014428.5), the content of which is incorporated herein by reference. As shown in FIG. 1, the heatsink 13 has a cavity 15 in which a battery 17 is mounted. As will be explained in more detail below, the battery 17 is for powering the light source(s) 7 in the event of a failure of the primary power supply.

Electronic circuitry 19 is provided within a base 21 of the lighting device 1. In this embodiment, the electronic circuitry 19 includes circuitry for determining an indication of the external electrical loading on the primary supply network and circuitry that controls the power drawn from the primary supply in dependence upon the determined indication. In this way, the power drawn by the lighting device 1 can be reduced at times of high demand on the primary supply network and/or can be increased at times of low demand. The operation of the lighting device 1 in this manner therefore helps to reduce the likelihood of a mains power supply failure (caused by excessive consumer demand). Whilst the reduction in demand is a very small percentage of the overall instantaneous demand, if a large number of similar lighting devices 1 also operate in this way, the reduction in the demand could be significant—helping to provide a more stable mains supply network. The way in which the indication of the external electrical loading on the primary supply network is determined will be described in more detail later.

Lighting Circuit

Figure 2:
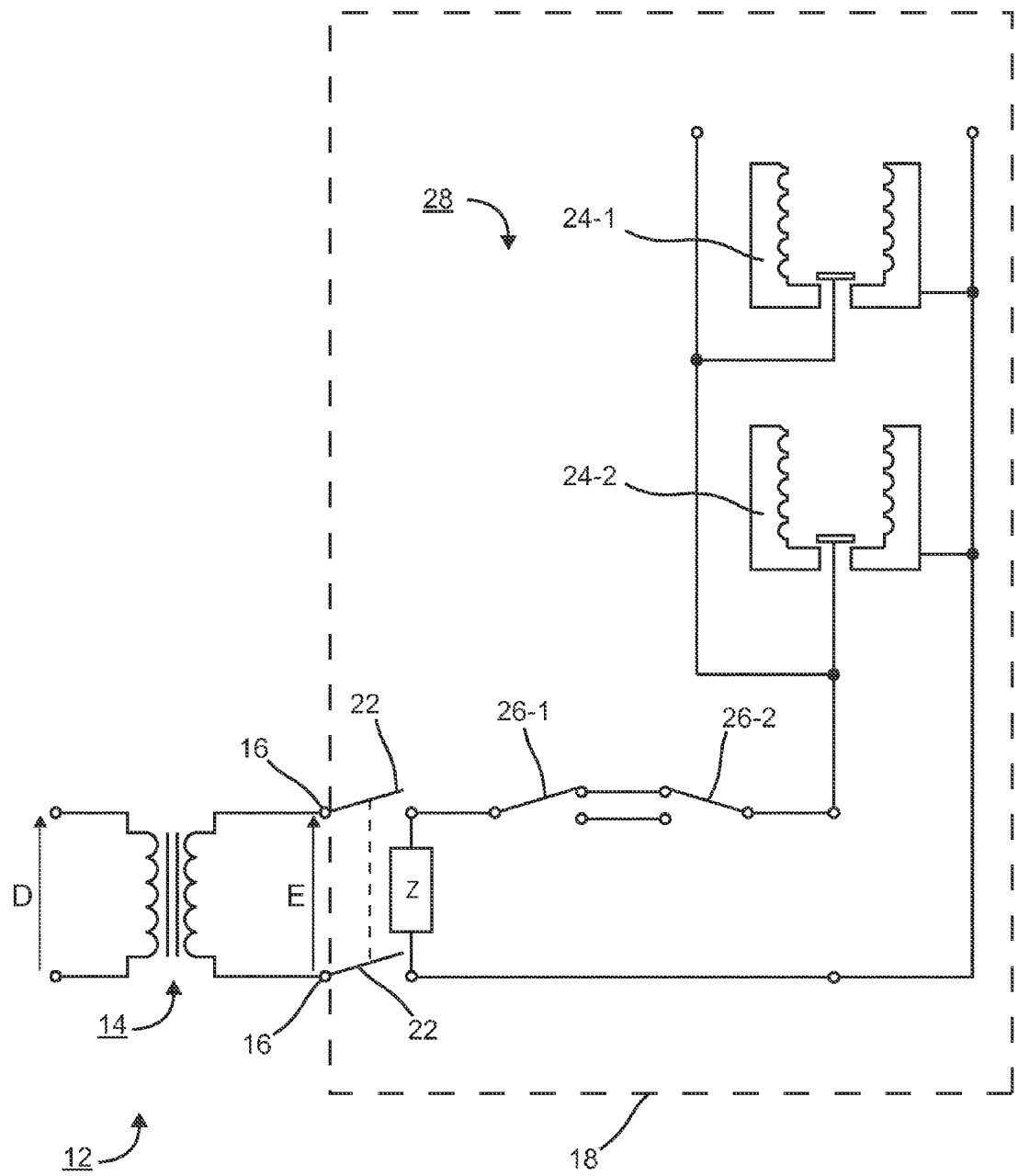
FIG. 2 is a schematic diagram illustrating a typical lighting circuit in which the lighting device shown in FIG. 1 may be installed.

FIG. 2 is a schematic diagram illustrating part of a typical primary power supply network 12 in which the lighting device 1 shown in FIG. 1 may be installed. As illustrated in FIG. 2, local or national grid supplied AC power is typically transformed down from a very high transmission potential D, usually in the order of thousands of volts, to a lower "mains" supply usually in the order of low hundreds of volts by a transformer 14. The secondary winding of the transformer 14 will provide power to one or more local consumers across terminals 16, here representing the external connections into a building 18. This input supply (shown as potential E) usually passes through appropriate current limiting protection devices 22 (fuses, circuit breakers etc.) which are typically mounted within a distribution board, consumer unit or the like. As shown in FIG. 2, two light holders 24-1 and 24-2 are connected within a lighting circuit 28 to the current limiting devices 22 via user operable switches 26-1 and 26-2. In this illustration, the switches 26 are shown in a two-way configuration, although there may only be a single switch 26 or multiple switches connecting the holders 24 to the current limiting devices 22. Thus, lighting devices 1 mounted in such light holders 24 will have a mains power supply as the primary power supply for illuminating the light sources 7.

Operating Modes

In this embodiment, the lighting device 1 has a number of different modes of operation and the appropriate mode of operation is determined based on the external electrical loading on the primary power supply to the lighting device 1. In this embodiment, there are three loading categories that define three different operating modes—normal mode, economy mode and charging mode. Different categorisations (and operating modes) could of course be used—having fewer or more categories. In this regard the reader is referred to the applicant's co-pending GB application GB 1105485.5 which describes a number of other operating modes that the lighting device 1 may have.

Normal Mode

The normal mode of operation is defined to occur when there is a normal loading present on the primary power supply network 12. In the normal operating mode, the electronic circuitry 19 uses power from the primary power supply to illuminate the light sources 7 and to power the circuitry 19 as required. During the normal mode, the battery 17 may be charged (or partially charged) to a certain minimum capacity level, if it is determined that the battery 17 charge is particularly low or a diagnostic test is being carried out.

Economy Mode

The economy mode of operation is defined to occur when there is a high loading present on the primary power supply network 12. During this mode, the electronic circuitry 19 ensures that the lighting device 1 draws no or minimal electrical power from the primary power supply (for example for making appropriate measurements). If desired, in this mode, the primary power supply may optionally be isolated or disconnected from the power consuming components of the lighting device 1, to ensure no power is drawn from the primary power supply. In this embodiment, the battery 17 is used to provide a secondary power supply so that the electronic circuitry 19 can continue to function and so that the lighting device 1 can continue to emit light even when in the economy mode of operation. In this embodiment, the lighting device 1 delivers power from the battery 17 to the light sources 7 until the battery charge has fallen below a defined lower threshold level—at which point power may be drawn again from the primary power supply. In this mode, battery charging is inhibited.

Charging Mode

The charging mode of operation is defined to occur when there is a low loading present on the primary power supply network 12. During this mode, the battery 17 is intelligently (re)charged as required using energy from the primary power supply, typically via a step-down transformer, switched mode power supply or other voltage reducing and rectifying subsystem. The charging of the battery 17 is controlled by the electronic circuitry 19 which monitors the charge rate and cell voltage to prevent over-charging.

Diagnostic and Mode Indicators

In this embodiment, the lighting device 1 has a diagnostic indicator 23 in the form of a light emitting diode that is connected separately to the electronic circuitry 19. The electronic circuitry 19 can control the diagnostic indictor 23 to either continuously or intermittently indicate the current operating mode and/or to indicate any fault detection therein. This may be achieved, for example, by varying the illumination of the diagnostic indicator 23 or, if multiple different LEDs are provided with different colours, these can be illuminated to indicate different diagnostic states.

Remote Control

As shown in FIG. 1, the preferred lighting device 1 also includes one or more communication transducers 25 that can receive signals from and transmit signals to another device (not shown) that is remote from the lighting device 1. These external signals may be used, for example, to control the operation of the lighting device 1, if diagnostic testing or configuration by a remote operator is desired. The communication transducer 25 may be, for example, an optical transducer (such as an infra-red transducer) or an acoustic or an electromagnetic transducer (such as an RF transceiver) which can communicate with the remote device using corresponding wireless signals. The remote device can be a simple battery or otherwise powered hand held controller having a number of functional buttons (or the like) for allowing a user to input control commands to the lighting device 1.

This remote control feature may be used, for example, to vary the brightness of the light generated by the lighting device 1. This can be achieved, for example, by varying the power (current and/or voltage) applied to the light source(s) 7. Alternatively, if the light source(s) 7 are arranged in different groups, with the light source(s) 7 in each group being independently powered by the electronic circuitry 19, then the brightness can be varied by varying the number of light source(s) 7 that are simultaneously powered. The remote control feature could also be used to alter the fundamental operation of the lighting device 1, e.g. disable frequency sensing for high demand power reduction and or low demand charging, or parameters thereof.

The communication transducer 25 can also be used to communicate the status and/or diagnostic information to the remote device. For example, the electronic circuitry 19 may be arranged to monitor the charge status of the battery 17 and this remaining charge status may be signalled to the remote device via the communication transducer 25.

The communication transducer 25 can also be used to receive user programming information input via an external device for storage within a memory of the electronic circuitry 19. This user programming could define, for example, emitter brightness when operating with power supplied by the primary power supply and emitter brightness when operating with power supplied by the secondary power supply such as battery 17; or the rate at which or manner in which self-diagnostic tests and results are performed and signalled via the diagnostic indicator 23. The remote control signal can also be used to turn the lighting device 1 on or off even when there is no power failure or outage, or when the user operable switches 26 are open. This function could be used, for example, in a building scenario where a central control station instructs a plurality of lighting devices 1 within the building to switch off or to switch on at a defined level of illumination for night time illumination purposes, for function testing, or for emergency purposes, for example as instructed by a signal received from a fire alarm control system Load Determination Electrical grid networks supplying alternating current from mechanical generators to multiple loads typically suffer problems with supply and demand balancing when the loading on the network changes. As the power requirements of these loads change, the change in demand upon the generator(s) will result in a variance in rotational speed and hence alternating current frequency, which results in a measurable lower than average frequency during high loading periods (both short and prolonged intervals) and a higher than average frequency during low loading periods.

Measuring the input frequency of the primary power signal (a variable which will have a virtually constant instantaneous value regardless of the measurement point in the AC power network 12, even for nationwide networks) provides an indication of the electrical loading on the primary power supply network 12. Therefore, as will be explained in more detail later, the electronic circuitry 19 measures the frequency of the primary power signal and from this measurement determines if there is a high, normal or low loading on the primary power supply network 12; and from this determines its operating mode.

Electronic Circuitry

FIG. 3 is a block diagram illustrating the main components of the electronic circuitry 19 used in this preferred embodiment. As shown, the circuitry 19 includes a power supply unit 31 that is connected to primary supply terminals 33 provided in the fitting 5, for connection to the primary power supply circuit 12; and secondary supply terminals 34 for connection to the positive and negative terminals of the battery 17 (not shown in this Figure). The electronic circuitry 19 also includes a processor 35 that controls the operation of the electronic circuitry 19; frequency sensing circuitry 37 which senses the frequency of the primary power supply signal received at the primary supply terminals 33; impedance sensing circuitry 38 which senses the impedance across the primary supply terminals 33; a charging circuit 39 for charging the battery 17 via the terminals 34; a diagnostic module 41 for performing various diagnostic tests and for controlling the diagnostic indicator 23 via terminal 43; and a communications module 45 for communicating with remote devices via the communication transducer 25 connected via terminal 47. The electronic circuitry 19 itself is powered by the power supply unit 31 which will generate power for the electronic circuitry 19 from either the primary power signal received at primary supply terminals 33 and/or from the secondary power signal received at secondary supply terminals 34.

As shown in FIG. 3, in this embodiment, the electronic circuitry 19 also includes two output drivers 50-1 and 50-2 that are controlled by the processor 35 and that provide the desired drive currents for driving the light sources 7 via output terminals 49 and 51. In this embodiment, the light sources 7 are arranged in two groups, with the light sources 7 in each group being driven by a respective one of the output drivers 50. Thus, in this embodiment, the processor 35 can switch on the light sources 7 in both groups at the same time or the light sources 7 in either one of the groups by controlling the respective output driver circuits 50. The processor 35 can also vary the brightness of the light sources 7 in each group by setting a desired drive power for each output driver circuit 50.

In the block diagram illustrated in FIG. 3, the different modules are shown as being separate modules from the processor 35. In practice, the functionality of many of the modules shown in FIG. 3 will be software modules run by the processor 35 or a mix of software and hardware. The modules have been illustrated in the form shown in FIG. 3 for ease of understanding the functions and operation of the different modules. A more detailed description of the various modules will now be given.

Power Supply Unit

The power supply unit 31 is configured to transform the primary supply voltage, for example by step-down transformer, switch mode power supply or other voltage reducing and rectifying subsystem; and to provide power derived from the primary supply (or if there is no primary supply at the supply terminals 33, to supply power from the battery 17 via terminals 34) to the processor 35 that controls the operation of the lighting device 1. The power supply unit 31 provides electrical isolation and step-down voltage transformation in order to provide an interface between the high voltage terminals 33 and the low voltage modules of the electronic circuitry 19—including the frequency sensing circuitry 37. The power supply unit 31 also provides the power required for illuminating the light sources 7.

Processor

In this embodiment, the processor 35 is at the heart of the electronic circuitry 19 and controls the operation of all of the modules shown in FIG. 3. The processor 35 may be based on an ASIC device but is preferably a programmable processor (such as a PIC microcontroller) having memory and software that defines its operation. Such software controlled processors are easier to update with improved software or additional functionality after installation.

Output Driver

The output drivers 50 are controlled by the processor 35 and generate the driving currents (or voltages) required to drive the light sources 7. The output driver 50 used will depend on the technology and configuration of the light source(s) 7 being driven. In this embodiment, the light sources 7 are LEDs and the output drivers 50 can be commercially available integrated circuit LED drivers having features such as efficient Pulse Width Modulation (PWM) current feedback driving of the LEDs, whether individually or in one or more "strings". Each output driver 50 is controlled (independently or as a single entity) by the processor 35 and can generate a respective different drive current (or voltage) at its output terminals 49/51. The output drivers 50 obtain their power for generating the drive signals from supply voltages generated by the power supply unit 31.

Communications Module

The communications module 45 is operable to control communication between the lighting device 1 and an external device. The communications module 45 is responsible for performing any required modulation, demodulation, encoding and decoding of the data to be transmitted to and received from the external device. For example, the communications module 45 may transmit diagnostic data obtained from the diagnostic module 41 to a remote device for remote monitoring of the operation of the lighting device 1. Alternatively, user configuration data may be received by the communications module 45 from a remote device and programmed into the processor 35. The data may be received or transmitted by the communications module 45 using the communications transducer 25 via the terminal 47. Alternatively, the communications module may receive data from and/or transmit data to the external device using the primary supply network 12 via the power supply terminals 33. In this case, the data signal is preferably modulated onto a carrier signal at a higher frequency than that of the primary power signal itself—so that the data signal can be isolated from the power signal.

Charging Circuit

In this embodiment the charging circuit 39 is provided to monitor the charge status of the battery 17 and to re-charge the battery 17 when needed and when the lighting device is in the charging operating mode. By monitoring the charge status of the battery 17, the charging circuit 39 can ensure that the battery 17 is not overcharged. The charging circuit 39 can also signal the present battery charge status to the diagnostic module 41 for historical recording and analysis and/or for output to the user for example via communication module 45. In this embodiment, the charging circuit 39 also manages battery usage, so that the battery charge is not completely exhausted, which may otherwise result in potential battery damage. Therefore, in this embodiment, the charging circuit 39 signals the processor 35 to stop providing power from the battery to the output driver 50 when the battery charge falls below a defined lower threshold level. The lower threshold level can also be defined to allow the lighting device 1 to emit light using power from the battery 17 for a predetermined minimum time period as an emergency lighting device when the primary power supply has been interrupted. Thus if operating in the economy mode—where the light sources 7 are powered by the battery 17, the charging circuit 39 can cause the lighting device 1 to return to its normal operating mode (so that the light sources 7 are powered from the primary power supply) if it detects that the charge status of the battery 17 falls below a threshold charge level.

Diagnostic Module

The diagnostic module 41 performs various diagnostic tests and presents the diagnostic results to the user via the diagnostic indicator 23. The diagnostic results can also be stored within a memory (not shown) of the processor 35 to maintain an historical record of the operation of the lighting device 1. The diagnostic module 41 may interact with the charging circuit 39 in order to obtain battery charge status information and with the sensing circuitry 37/38, the communication module 45 and the output driver 50 to confirm correct operation thereof. The diagnostic module 41 may also present any faults detected within the device to the user via diagnostic indicator 23. The operation of the diagnostic module 41 can be controlled by the user either via signals received using the communication module 45 or other signals communicated, for example, over the primary supply via terminals 33, or by the processor 35 as part of its execution.

Impedance Sensing Circuitry

The impedance sensing circuitry 38 is for sensing the impedance across the primary supply terminals 33 via the power supply unit 31. In most installations, the lighting circuit 28 (in which the lighting device 1 will be installed) will include one or more manually operable switches 26 for allowing the user to switch on and off the lighting device 1. Therefore, the impedance sensing circuitry 38 is used to distinguish between the situation where the primary power supply has been removed by the user opening a switch 26 and the situation when there is a primary power supply failure and the switch(es) remain closed. In particular, when there is a primary power supply failure and the light switch 26 is switched on, the sensed impedance will be relatively low; whereas when the user has switched off the light at a light switch 26, the sensed impedance will be relatively high. Thus, when the sensed impedance is high, the processor 35 does not allow power to be supplied to the light sources 7 from the battery 17; and when the sensed impedance is low and there is no primary power, it does allow power to be supplied to the light sources 7 from the battery 17. The way in which this impedance sensing can be performed is described in the applicant's earlier patent GB 2447495 and in co-pending GB patent application number GB 1105485.5.

Frequency Sensing Circuitry

As discussed above, the frequency sensing circuitry 37 is for sensing the frequency of the power supply signal received at terminals 33. This frequency sensing is performed to determine the real-time grid demand at the time that the measurements are made. This primary power supply signal is typically an AC signal having an RMS voltage in the range of 88 to 265 Volts and a nominal frequency of 50 or 60 Hz depending on the geographic zone in which the lighting circuit is located. Variations in this frequency due to loading on the primary power supply network 12, though often small, can be as much as +−5%.

Figure 4:
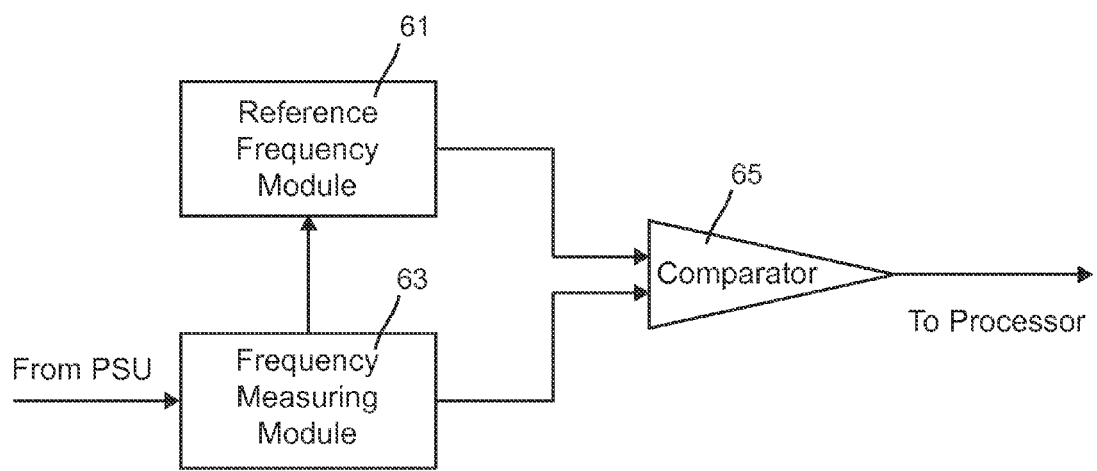
FIG. 4 is a block diagram illustrating components of a frequency sensing circuit forming part of the circuitry shown in FIG. 3.

The way in which the frequency sensing circuitry 37 performs the frequency sensing in this embodiment will now be described with reference to FIG. 4, which shows the main components of the frequency sensing circuitry 37. As shown in FIG. 4, the frequency sensing circuitry 37 has a reference frequency module 61 that outputs a value indicative of the expected normal frequency of the primary power supply signal. In the UK and Europe this may be a value corresponding to 50 Hz whereas in the US this may be a value corresponding to 60 Hz.

The frequency sensing circuitry 37 also includes a frequency measuring module 63 that measures the frequency of the incoming power supply signal (or at least a suitably voltage reduced version of it supplied by the PSU 31). There are various ways in which the frequency measuring module 63 can measure or determine the frequency of the primary power supply signal. For example, the frequency of the power supply signal can be determined by the frequency measuring module 63 through counting the number of times the power signal passes through a reference voltage (such as ground) in a defined period of time. Alternatively, the input signal may be half wave rectified, then converted into a pulse width modulated signal and the frequency determined by measuring the time between the rising edges of the PWM signal. Alternatively, the input signal may be half wave rectified, then integrated to give a voltage whose magnitude depends on the frequency of the input signal. Alternatively still module 63 may perform a frequency analysis (using frequency transform methods) of the power supply signal to identify the location on the frequency axis corresponding to the peak in the spectrum of the power supply signal. More specifically, an FFT may be performed over a number of frequency bins around the expected supply frequency and then the frequency bin having the largest signal magnitude identifies the frequency of the power supply signal. As a further alternative, the power supply signal may be passed through a bank of parallel band pass filters—each having a different centre frequency and with the centre frequencies of the filters spanning the range of frequencies that the power supply signal is expected to have for the different loadings. The frequency of the power supply signal can then be determined by identifying the filter with the largest output signal level. Various other techniques could of course be used or employed by frequency measuring module 63 to measure, quantify, compute, deduce, compare or otherwise analyse the frequency of the incoming power supply signal.

The frequency determined by the frequency measuring module 63 is then compared with the reference frequency output by the reference frequency module 61 using a comparator 65 and the comparison results are passed to the processor 35 for analysis. The comparator 65 may be a differential operational amplifier or other similar hardware or software component. If the measured frequency is lower than the reference frequency by a first threshold amount, then the processor 35 determines that there is a high loading on the primary power supply network 12 and so enters the above described economy operating mode. If the measured frequency is higher than the reference frequency by a second threshold amount (which may be the same as, or different from, the first threshold amount, to provide for hysteresis), then the processor 35 determines that there is a low loading on the primary power supply network 12 and so enters the above described charging operating mode. If the measured frequency is neither higher nor lower than the reference frequency by these threshold amounts, then the processor 35 determines that there is a normal loading on the power supply network 12 and so enters the above described normal operating mode. Depending on the determined frequency, the processor 35 may also control the other devices forming part of the circuitry 19—for example switching on or off the impedance sensing circuitry 38.

In this embodiment, the frequency measuring module 63 is arranged to determine the frequency of the power supply signal on an intermittent basis, although it could be determined continuously. The intermittent determination may be on a regular basis or on an ad hoc basis. In this embodiment, the frequency measuring module 63 is arranged to determine the frequency of the power supply signal once every second. If the processor 35 detects a change in the primary supply network loading, then the processor 35 may instruct the frequency measuring module 63 to repeat the measurement without waiting for the next measurement time, to make sure that the change is not due to measurement error. Once a number of measurements have been made that confirm the changed loading, the processor 35 changes the operating mode of the lighting device 1 accordingly.

As the actual supply voltage frequency may not normally be 50 Hz under normal loading conditions, in this embodiment, the reference frequency module 61 is dynamically calibrated during normal use by using a running average of the measured frequency determined by the frequency measuring module 63. In this way, slowly varying changes of operating frequency can be filtered out of the calculations. Such slow variations may arise, for example, due to aging effects of the electronic circuitry 19. This self calibration also allows the lighting device 1 to be able to automatically determine whether it is connected to a nominal 50 Hz mains circuit or to a 60 Hz mains circuit and to set the appropriate reference frequency value accordingly.

Additionally, in this embodiment, the processor 35 is also programmed to use the measured frequency to determine if the lighting device 1 is actually being powered by a mains power supply or if it is being powered by a local power generator—which will be subject to greater frequency variations. In particular, if the lighting device 1 is being powered by a 50 Hz mains power supply signal, then it is very unlikely that the measured frequency will be less than 47 Hz or greater than 53 Hz. Similarly, if the lighting device 1 is being powered by a 60 Hz mains power supply signal, then it is very unlikely that the measured frequency will be less than 57 Hz or greater than 63 Hz. Therefore, if the processor 35 detects that the measured power supply frequency is lower than 47 Hz, higher than 63 Hz or between 53 Hz and 57 Hz, then it determines that the lighting device 1 is not being powered by a mains power supply—and so operates in the normal operating mode regardless of the measured frequency. It then remains operating in this mode until the processor 35 determines that the measured frequency stabilises within the above ranges typical for a mains power supply signal.

Second Embodiment

Figure 5:
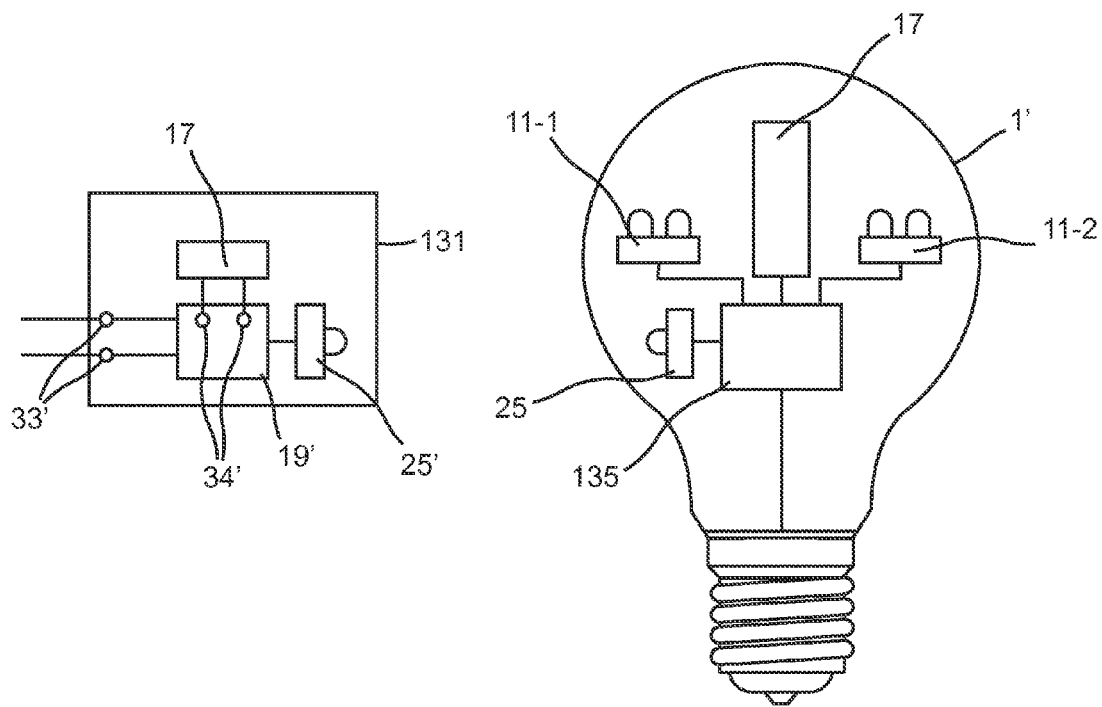
FIG. 5 is a schematic diagram illustrating a further embodiment in which circuitry for determining the loading on a primary supply network is provided remotely from the lighting device.

FIG. 5 illustrates a second embodiment in which electronic circuitry 19' for determining the loading on a primary supply network is provided within a device 131 that is located remotely from the lighting device 1', but connected at some point to the same primary supply network 12 to which the lighting device 1' is connected. In this embodiment, the remote device 131 comprises electronic circuitry 19' that is coupled to the primary power supply via terminals 33' and optionally coupled to a battery 17' via terminals 34'. The electronic circuitry 19' includes the frequency sensing circuitry 37 described above and operates to determine the frequency of the primary power supply signal received at terminals 33'. The remote device 131 also includes a communication transducer 25' that is used to communicate with the communication transducer 25 mounted in the lighting device 1'. In this embodiment, the lighting device 1' comprises a processor 135; lighting arrays 11-1 and 11-2; a battery 17 and a communication transducer 25.

In this embodiment, the electronic circuitry 19' is configured to measure the frequency of a power signal at terminals 33' in order to determine the loading on the primary power supply network 12. The electronic circuitry 19' is optionally powered by a battery 17' to allow the remote device 131 to continue functioning in the case of a failure in the primary power supply coupled to terminals 33' (which if detected may also be communicated to the lighting device 1').

In this embodiment, the remote device 131 uses the communication transducer 25' to communicate a signal indicating the electrical loading on the primary supply network 12 to the lighting device 1' via the communication transducer 25 forming part of the lighting device 1'. As before, the communication transducers 25 and 25' may be, for example, optical transducers (such as infra-red transducers) or acoustic transducers or electromagnetic transducers (such as RF transceivers) which can communicate with each other using corresponding wireless signals. The communication transducer 25 provided in the lighting device 1' passes the received signal indicating the loading on the primary power supply network 12 to the processor 135, which uses the received signal to select the operating mode—either the normal operating mode, the economy operating mode or the charging operating mode. The processor 135 may power the lighting arrays 11 using power drawn from the battery 17 when in the economy operating mode (or of course during a power outage or a diagnostic testing routine).

In a slight modification to this embodiment, the remote device 131 may be arranged to transmit the data signal indicative of the primary supply network loading over the primary supply circuitry 28 via terminals 33' (or indeed over some other wired connection). In this case, the data signal is preferably transmitted on a carrier signal having a much higher frequency than that of the primary power supply signal, so that the communications module 45 forming part of the circuitry in the lighting device 1' can isolate the data signal from the primary power signal.

Third Embodiment

FIG. 6 is a block diagram of electronic circuitry 19 that may be used in a lighting device 1 according to a simplified embodiment. In this simplified embodiment, the lighting device 1 does not have a secondary power supply (e.g. battery 17). In this simplified embodiment, the lighting device 1 is arranged either to measure the frequency of the primary power supply signal received at terminals 33 using the frequency sensing circuitry 37; or is arranged to receive a signal indicative of the external loading using the communications module 45 which receives a signal via the primary supply connection or from a communications transducer via terminal 47. To simplify the circuit further, the frequency sensing circuitry 37 or the communications module 45 may be omitted if desired.

In this embodiment, during economy mode, the processor 35 ensures the lighting device 1 draws no or reduced electrical power from the primary power supply, and thus the light output of the light emitters will decrease.

Modifications and Alternatives

In the first embodiment described above, when it is determined that there is a high loading on the primary power supply network, the power drawn from the primary power supply is minimised. In an alternative embodiment, the power drawn from the primary power supply may simply be reduced and augmented, if desired and available, by power drawn from the secondary power supply (for example if it is desired to maintain a constant illumination power). Similarly, when it is determined that there is a low loading on the primary supply network, more power may be drawn from the primary power supply by increasing the number of light sources that are illuminated or by increasing the power supplied to the light sources. In some embodiments, the charging process may not be affected by the measured primary power supply loading—instead the variation in the power drawn from the primary power supply may be achieved by varying the power delivered to the light sources. Similarly, the power supplied to the light sources from the primary power supply may not be affected by the measured primary power supply loading—instead the variation in the power drawn from the primary power supply may be achieved by varying the operation of the charging circuit.

In the first embodiment described above, a battery 17 was mounted within a cavity of a heatsink used to extract heat from the light sources. As those skilled in the art will appreciate, the mounting of the battery and the use of this particular heatsink is not essential. The battery may be mounted in any convenient location (wholly or partially external to the lighting device enclosure if desired) and the heatsink can have any desired form or can be omitted entirely depending upon the light source technology and its operational performance requirements.

In FIG. 2, light holders 24 are depicted as being connected to the primary power supply via user operable switches 26. Alternatively, the light holders 24 may be directly connected to the primary power supply, i.e. not via user operable switches 26. In such an embodiment the light holders 24 will have a permanent power connection, wherein disconnection would only occur in the case of a fault with the primary power supply, for example an event occurring within a current limiting protection device 22, such as a blown fuse, or the failure of the primary power supply, for example a local distribution system power cut or outage. To provide user control over illumination in such an embodiment, the lighting device 1 could be arranged to receive a control signal from an external device (using communications module 45) to control the turning on and off of the light sources 7. Alternatively, the lighting device may have a hardwired switch mounted within, on or near to the lighting device itself, which can be used to control the turning on and off of the light sources 7. Turning the light sources on and off may also be controlled by a proximity, ambient light or PIR sensor. Operationally, one advantage of having such a permanent primary power supply (when available from grid or otherwise supply network) is evident during occurrences of surplus grid power (as determined by the measured frequency, external signals or otherwise), where charging of the battery may take place regardless of whether or not the lighting device 1 is turned on by the user.

In the above embodiments, the light sources 7 that were used in the lighting device 1 were LEDs. As those skilled in the art will appreciate, the use of LEDs is preferred given their ease of driving and low power consumption. However, the light sources 7 can be formed from any lighting technology, such as compact fluorescent tubes, incandescent lighting (such as halogen lighting) etc. Further, the LEDs were driven by two drive circuits 50. In an alternative embodiment, fewer or more drive circuits 50 may be provided.

In the above embodiments, a measure of the loading on the primary power supply network was obtained by measuring the frequency of the primary power supply signal. In an alternative embodiment, a measure of the loading may be determined by measuring the voltage (whether peak or fluctuations thereof) of the primary power supply or by a combination of voltage and frequency measurements.

In the above embodiment, the lighting device incorporating the lighting control device took the form of a normal look-a-like light bulb. However, the lighting device can also take other forms, such as the form of an elongate tube similar to the common fluorescent "strip light" variety. An example of such an embodiment is illustrated by strip lighting device 99 in FIG. 7, the features of which are a re-arrangement embodying those illustrated for lighting device 1 shown in FIG. 1.

Figure 7:
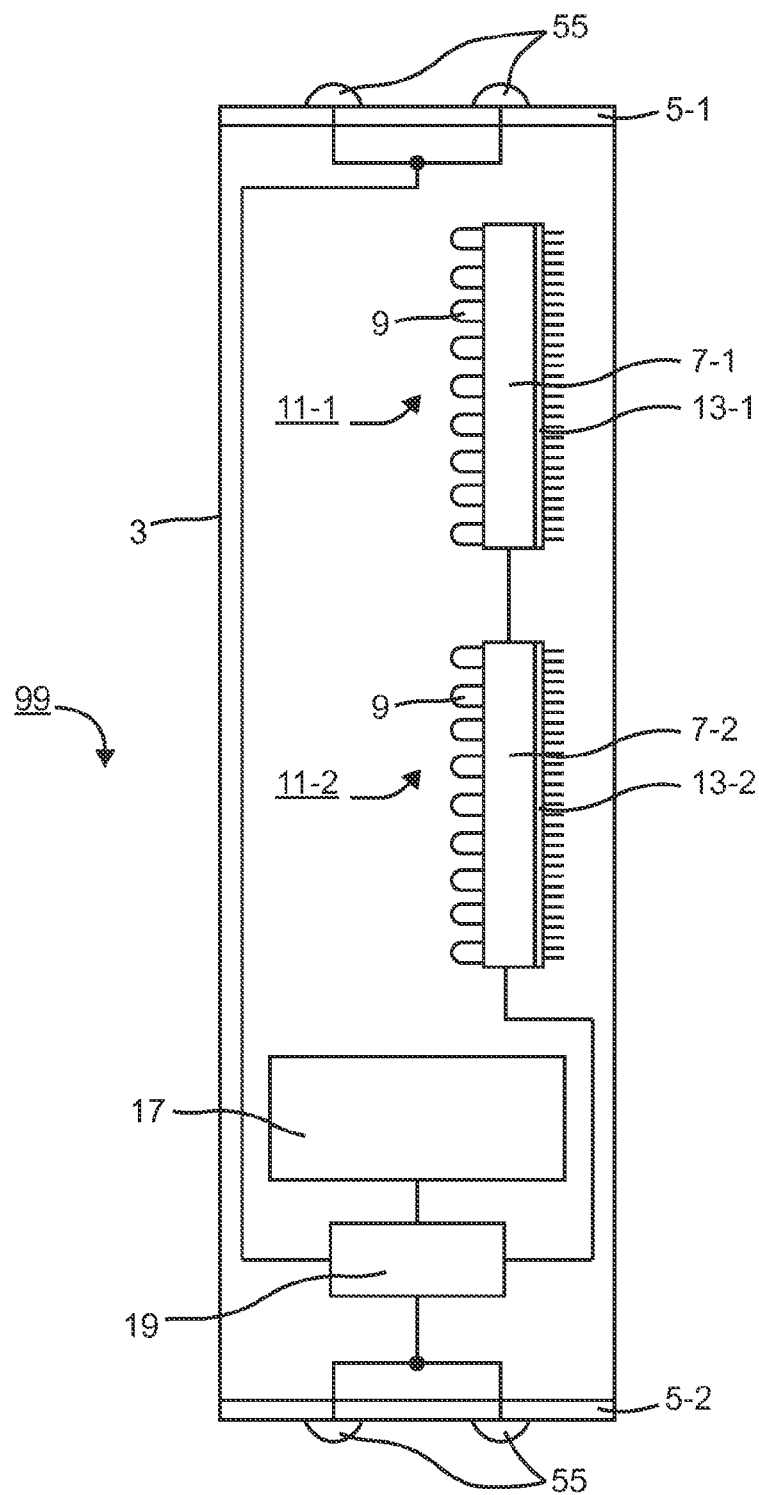
FIG. 7 is a schematic view of one embodiment of a strip lighting device for connection to a conventional strip-light lamp holder and that can be provided with the circuitry shown in FIG. 3 or FIG. 6.

The strip lighting device 99 of FIG. 7 has an optically transparent/translucent housing 3 in the form of an elongate tube, mechanically coupled to end cap fittings 5-1 and 5-2. The fittings 5 are for connecting the strip lighting device 99 to a conventional strip light holder, which in turn connects the strip lighting device 99 to a primary power supply via terminals 55. One or more light sources 7-1 and 7-2 are provided within housing 3, which may comprise a plurality of light emitting diodes 9 that are arranged in one or more arrays 11-1 and 11-2, optionally mechanically and thermally connected to one or more heatsinks 13-1 and 13-2 as previously discussed for lighting device 1. Similarly, strip lighting device 99 includes battery 17 and electronic circuitry 19 as afore described.

In the main embodiment discussed above, the lighting device 1 was a single unitary device. In alternative embodiments, some of the components and some of the functionality may be moved to another device which controls the powering of a lighting device (such as a conventional bulb). This may be achieved, for example, using an in-line adapter that sits between a conventional light bulb and the lamp holder. Such in-line adapter embodiments are illustrated in FIG. 8. As shown, the in-line adapter 101 sits between the primary power supply 103 and a conventional lighting device (or devices) 105. The in-line adapter 101 may be a readily interchangeable device such as the arrangement shown in FIG. 8a, or a more permanent installation such as the example shown in FIG. 8b.

The in-line adapter 101 will typically have the same electronic circuitry 19 as in the first embodiment, enclosed within a suitable housing or casing 107. This can then be retrofitted to an existing lighting circuit by connecting the fitting 5-1 of the in-line adapter 101 into an appropriate vacant lamp holder 24 providing optional mechanical and electrical connection to the primary power supply 103. A plurality of lamps or lighting devices, shown here as a single conventional light bulb 105 having light fitting 5-2, mechanically and electrically interface with a lamp holder 109 that forms part of the in-line adapter 101.

During normal operation, a switching device 113 such as a mechanical or solid-state relay controllable by the electronic circuitry 19 allows power from the primary power supply from 103 to be routed to the lamp holder 109 for purposes of powering the light bulb 105. In embodiments where the electronic circuitry 19 senses the impedance of the lighting circuit (to detect for a power outage situation such as through techniques described in the applicant's co-pending GB application GB 1105485.5), this switching device 113 may be controlled by the electronic circuitry 19, and is an important requirement specific to this in-line adapter embodiment, since the impedance sensing technique for detecting external switch positions cannot be reliably performed when certain types of conventional light bulbs (ones having a low internal impedance) are connected across the primary supply terminals 103—as the presence of such a conventional low impedance light bulb may cause the sensing circuitry 37 to determine that the manually operable switches 26 are closed circuit when in fact they are open circuit. Thus, when impedance measurements are to be made, the switching device 113 is activated or otherwise utilised to disconnect the conventional light bulb 111 from the supply 103. The frequency sensing of the mains signal is performed as before and the power drawn from the secondary power supply (such as the battery 17) is controlled accordingly.

An additional feature that can be performed by the electronic circuitry 19 in this embodiment (due to the presence of the switching device 113) is that it can allow the illumination of the light sources 91 on the in-line adapter 101 without illuminating the conventional light bulb 105. This could be triggered by signals received from an external device such as from an external user-controlled remote controller, using the communication transducer 25 shown here for example conveniently integrated within the LED array 91.

An alternative embodiment of an in-line device 101' is illustrated in FIG. 8b, in which the in-line adapter 101' is incorporated in proximity to or within the ceiling rose forming the usual junction for electrical connection and mechanical suspension of a pendant light 111 (as shown), multiple lamp chandelier or the like. The operation of such a system remains the same as that outlined for FIG. 8a.

Thus light array 91 may provide more prominent illumination due to its advantageous positioning above that of the pendant light bulb 111. In this illustration, the light array 91 is formed from a plurality of individual LED emitters 9 arranged in multiple rings to utilise the additional space created by detachment of lamp holder 109 via the lighting cable 121. Furthermore, the aesthetic design constraints of such an in-line device 101' are harmonised since it may be at least partially housed in enclosures similar to existing hardware and or using conveniently available space voids, here shown partially located within the ceiling juncture 123.

The in-line device 101' shown in FIG. 8b is designed to be installed on a more permanent basis. Therefore, fitting 5-1 has been replaced with a suitable electrical interface that enables electric wires or cable to be connected thereto. The example illustrated in FIG. 8b shows such an arrangement, with a plurality of terminal blocks 125 housed within enclosure 127 which may or may not be integral to the main enclosure housing 107 of the in-line adapter 101'. If the enclosure 127 is separate from the main housing 107 of the in-line adapter 101', then an additional detachable interface may be included to interconnect components within enclosures 127 and 107. This yields the advantage of allowing convenient interchangeability of such a semi-permanent in-line embodiment, including the ability of the in-line adapter 101' to optionally retrofit an existing interface such as a pre-installed ceiling rose that permits straightforward interchange of various suspended lighting devices to be utilised without manual electrical installation. Further advantages include a greater accessibility to the main housing 107 allowing easier battery 17 replacement, and naturally the safety and time advantages in not having to make permanent electrical connections between the in-line device 101' and the primary power supply 103.

In the main embodiment described above, the electronic circuitry 19 used for controlling the lighting device was mounted within the housing of the lighting device itself. In an alternative embodiment, the electronic circuitry 19 used to control the light sources may be provided in a separate housing. Such an embodiment would allow the invention to be able to operate, for example, with conventional "low voltage" lamps. Such a conventional low voltage lamp typically comprises multiple low voltage light emitters forming a plurality of luminaries. These historically featured incandescent lamps, usually tungsten halogen technology, although retrofit LEDs in traditional lamp holders, such as the GU series holders, have been available in recent years. Such low voltage lighting systems typically utilise a supply potential difference below 50 volts (either AC or DC) provided by a power supply unit (PSU), which usually comprises a conventional transformer or switch mode power circuit. The PSU is typically fed by a mains power supply which it then converts and supplies for powering one or more lighting devices. Where the converted signal is a DC signal, the lighting device 1 shown in FIG. 1 is not readily able to then monitor the AC frequency using the frequency sensing circuitry 37 because there is no AC supply that the frequency sensing circuitry 37 can process to determine the instantaneous status of grid demand. Additionally, where the lighting device 1 is also arranged to sense the impedance of the lighting circuit using the impedance sensing circuitry 38, problems also arise with this embodiment as the PSU does not allow for a direct measurement of the impedance at the input side of the PSU.

However, if the conventional low voltage PSU is replaced by a modified PSU that contains at least the main components of the electronic circuitry 19 shown in FIG. 3 or 6, then this will overcome these problems. Such an embodiment is schematically illustrated in FIG. 9. As shown, the electronic circuitry 19 is mounted in a separate housing 131 that can be placed anywhere on the lighting circuit 28 (shown in FIG. 2) so that the frequency sensing circuit 37 can sense the frequency of the AC mains signal (and if the impedance sensing circuitry 38 is present, the impedance across the primary power supply terminals 33). In this case, the housing 131 also includes a secondary power supply in the form of a battery 17. The output terminal(s) 49 and/or 51 (shown in FIG. 3) from the electronic circuitry 19 are then directly connected to the conventional low voltage lamp holder(s) 133 and thus the low voltage lights 134 will be powered either by power derived from the primary supply and/or from power derived from the secondary supply (the battery 17 in this example). In such an embodiment, the secondary power supply (such as the battery) may be mounted in the same housing 131 as the electronic circuitry 19 or it may be provided separately, for example, within a loft or ceiling space and connected to the electronic circuitry 19 at terminals 34. The secondary power supply may provide power directly to the low voltage lights or through a voltage-transforming PSU or the like (not shown).

The housing 131 may include additional output terminals so that multiple lamp holders 133 can be controlled by the circuitry 19. The housing 131 may also include a user interface (keypad, display switches etc) that allows a user to enter control commands, user configurations etc, for controlling the lighting devices 1 with which the circuitry in the housing 131 is arranged to communicate, or otherwise receive control signal(s) from one or more external devices.

The reference frequency module 61 shown in FIG. 4 may use other means to provide a reference frequency value. For example, the reference frequency value may be received from a remote device using the communications module 45. Alternatively, the reference frequency module 44 may generate its own reference frequency using an oscillator and then determine (measure) the frequency of the signal thus generated. This would allow frequency measurement errors caused, for example, by changing operating temperatures of the electronic circuitry 19, to be removed (as the same measurement error will be present in the measured reference frequency and in the measured power signal frequency, hence will be cancelled out due to the differencing operation of the comparator 65). In another embodiment, the processor 35 may be configured to perform all or some of the functions of the reference frequency module 61, the frequency measuring module 63 and the comparator 65 described above.

The processor 35 may directly control outputs such as the diagnostic indicator 53 and the light emitters 7 without a light driver. Light emitters 7 may be powered using either primary or secondary power from primary power supply through processor 35 or secondary power supply through battery 17, or optionally a combination of these supplies. Processor 35 may additionally control, by any method, through charging circuit 39 or otherwise, the replenishing of battery 17 or otherwise electrical storage devices internal or external to the lighting device for purposes of providing the secondary power supply.

The battery 17 may be provided separately from and connected to the lighting device 1 via the battery terminals 34 of the power supply unit 31. In the above embodiment, the lighting device 1 included a battery 17 for providing a backup or secondary power supply in the event of mains failure. The cell or cells of the battery can be of any technology, replaceable or non-replaceable and multiple batteries may be provided connected in series and/or in parallel. Alternatively, instead of using one or more batteries 17, other charge storage devices may be used to provide a secondary power supply, such as a capacitor. However, batteries are preferred since they can provide secondary power over a longer period of time. In one embodiment, the battery can be isolated from the electronic circuitry 19 so that the lighting device can only operate in its normal mode of operation. This may be done in response to a received user input or in response to detecting a battery fault or a fault in another system component or other situations, such as the first power-up of the lighting device when it is new out of the box, or if the lighting device has not operated for some time (say a few months).

In all Figures, some connections are shown as a single line for simplified explanatory purposes and may represent multiple electrical connections between system elements, which may themselves be optionally otherwise connected to other system elements as part of functionality requirements, such interfaces having been omitted from the diagrams for clarity.

In the embodiment described above, the lighting device included diagnostic and communication circuitry. As those skilled in the art will appreciate, this circuitry is not essential and could be omitted if desired. Additionally, one or more user switches or inputs may be mounted on the lighting device. This user input can be used to cause the lighting device to enter a given mode of operation or to enter user configurations or to initiate a diagnostic or self-test or isolate/connect the battery 17 to the electronic circuitry 19.

The invention described above can also be implemented in conventional emergency lighting devices (which will not include, for example, the above described impedance sensing circuitry but which do have a secondary power supply usually in the form of an internal battery). Such conventional emergency lights typically trickle charge their batteries all the time—and they usually have to provide at least 3 hours of illumination in the event of a mains power failure. Therefore any excess battery capacity could be used (to power the emergency light) during times of high grid demand in the event that the light is a 'maintained' emergency light or lighting system (always producing illumination) with optional battery charging above an arbitrary capacity threshold only taking place during low demand grid conditions. If the light is a 'non-maintained' emergency light (only comes on during a power outage), then battery charging may be prohibited during high grid demand.

In some of the above embodiments, the lighting device included a communication module 45 that was able to communicate with external devices using a communication transducer 25. In an alternative embodiment, the communication module 45 may be arranged to communicate with the external devices by receiving and/or transmitting signals over the lighting circuitry 28 in which the lighting device 1 is installed. Such communication signals would be transmitted at a different frequency to the mains signal in order that the communication signals can be separated from the mains signal. Instead of or in addition to using the communication transducer 25, the electronic circuitry 19 could communicate with one or more remote devices by varying the light produced by the light sources 7. For example switching them on and off in dependence upon the data to be transmitted. A receiver in the remote device would recover the data by detecting the variation in the light produced by the light source(s) 7. Regardless of the communication technique employed, various different standard communication protocols could be used for the communications between the lighting device and the remote device(s).

In the above embodiments, the lighting device 1 had a pair of primary supply terminals for connection to a primary supply, such as a mains supply circuit. In addition, another (separate) pair of terminals may be provided on the lighting device for connecting the lighting device to another power supply or otherwise source. This other power supply may be, for example, from a renewable energy source such as a photovoltaic cell or a wind turbine or the like. The power received from this additional AC or DC supply may be used to light the light sources and/or to charge the battery 17 via optional additional power supply control and management circuitry internal or external to the lighting device. It may also be a permanent connection to the primary power supply bypassing user operable switch(es) 26 from the partial primary power supply network shown in FIG. 2.

The invention claimed is:
1. A lighting control device comprising:
   a housing;
   a primary input power connection in the housing for receiving power from a primary power supply network;
   a secondary input power connection in the housing for receiving power from a secondary power supply;
   an output power connection in the housing for delivering power to one or more light sources; and
   electronic circuitry in the housing for controlling delivery of power from the primary and secondary input power connections to the output power connection to control delivery of power to the one or more light sources;
   wherein the electronic circuitry comprises:
   circuitry that determines an indication of an external electrical loading on a primary power supply network coupled, in use, with the primary input power connection; and
   circuitry that varies the power drawn from the primary and secondary input power connections in dependence upon the determined indication of the external electrical loading on the primary power supply network;
   wherein the lighting control device comprises:
   a normal mode of operation in which the electronic circuitry is arranged to deliver power from the primary input power connection to the output power connection for delivering power to the one or more light sources;
   an economy mode of operation in which the electronic circuitry is arranged to take no power or minimal power from the primary input power connection and to deliver power from the secondary input power connection to the output power connection for delivering power to the one or more light sources; and
   a charging mode of operation in which the electronic circuitry is arranged to deliver power from the primary input power connection to the secondary input power connection to charge the secondary power supply;

wherein the circuitry that determines an indication is arranged to determine a frequency measurement of a power signal received at said primary input power connection;

wherein the electronic circuitry is arranged to use the frequency measurement to determine whether there is a high demand, a low demand or a normal demand on the primary power supply network; and wherein the electronic circuitry is arranged to configure the lighting control device to operate in the charging mode if there is low demand on the primary power supply network; to operate in the normal mode if there is normal demand on the primary power supply network; and to operate in the economy mode if there is high demand on the primary power supply network.

2. The lighting control device according to claim 1, wherein the circuitry that varies the power drawn comprises a processor arranged to receive the indication of the external electrical loading and arranged to output control signals in dependence upon the determined indication of the external electrical loading on the primary power supply network, for controlling the power drawn from the primary and secondary power connections.

3. The lighting control device according to claim 1, wherein the circuitry that varies the power drawn from the primary and secondary input power connections is arranged to provide power delivered to the output power connection to maintain brightness of the one or more light sources independent of the electrical loading on the primary supply network.

4. A lighting control device according to claim 1, wherein the electronic circuitry further comprises:
circuitry that provides at least one threshold value; and
circuitry that compares the threshold value to the measurement of the frequency of the power signal.

5. The lighting control device according to any preceding claim, wherein the circuitry that varies the power is arranged to decrease the power drawn from the primary input power connection from a first non-zero power level to a second non-zero power level, when the circuitry that determines an indication determines that there is a high electrical loading on the primary power supply network.

6. The lighting control device according to claim 5, wherein the circuitry that varies the power is operable to decrease the power drawn from the primary input power connection by inhibiting operation of a charging circuit used to charge a secondary charge storage device associated with the lighting device.

7. The lighting control device according to claim 1, wherein the circuitry that varies the power is operable to decrease the power drawn from the primary input power connection by reducing brightness of light generated by the one or more light sources.

8. The lighting control device according to claim 1, wherein the lighting device is operable to replace power drawn from the primary input power connection with power drawn from the secondary power supply associated with the lighting device.

9. The lighting control device according to claim 1, wherein the circuitry that varies the power is arranged to increase the power drawn from the primary input power connection from a third non-zero power level to a fourth non-zero power level, when the circuitry that determines an indication, determines that there is a low electrical loading on the primary power supply network.

10. The lighting control device according to claim 9, wherein the secondary power supply is a charge storage device and wherein said circuitry that varies the power is operable to increase the power drawn from the primary power supply by allowing operation of a charging circuit used to charge the secondary charge storage device associated with the lighting device, and/or is operable to increase the power drawn from the primary input power connection by increasing brightness of light generated by the one or more light sources.

11. The lighting control device according to claim 9, wherein the lighting device is operable to replace or supplement power drawn from the primary input power connection with power drawn from the secondary power supply associated with the lighting device.

12. The lighting control device of claim 1, wherein the secondary power supply comprises a charge storage device and wherein the electronic circuitry further comprises circuitry that determines a remaining charge of the charge storage device; and
wherein the circuitry that varies the power is arranged to vary the power drawn from the secondary power supply in dependence upon the remaining charge of the charge storage device.

13. The lighting control device of claim 1, wherein the secondary power supply comprises a charge storage device; and
wherein the circuitry that varies the power is arranged to vary the power drawn from the secondary power supply in dependence upon the capacity of the charge storage device.

14. The lighting control device of claim 1, wherein the secondary power supply comprises a charge storage device; and
wherein during periods of high grid demand, the circuitry that varies the power is arranged to draw power from the secondary power supply for a predefined or deduced time period.

15. The lighting control device of claim 14, wherein the electronic circuitry further comprises circuitry that determines a remaining charge of the charge storage device; and wherein the circuitry that varies the power is arranged to reduce the power drawn from the secondary power supply during said period of time if the remaining charge of the charge storage device is below a threshold or if the secondary power supply has been used for a second period of time.

16. The lighting control device according to claim 1, wherein the circuitry that varies the power is arranged to increase the power drawn from the primary power supply when it reduces the power drawn from the secondary power supply, and/or is arranged to reduce the power drawn from the primary power supply when the circuitry that varies the power increases the power drawn from the secondary power supply.

17. The lighting control device according to claim 1, wherein said circuitry that determines an indication of an external electrical loading on a primary power supply network coupled, in use, with the primary input power connection is arranged to measure one or more parameters of the primary input power signal to determine instantaneous loading on the supply network.

18. A lighting control device according to claim 1, wherein the electronic circuitry further comprises circuitry that measures an external impedance coupled, in use, to the primary input power connection and wherein the circuitry that varies the power is arranged to control power drawn from the secondary power supply in dependence upon impedance measure.

19. The lighting control device of claim 18, wherein the circuitry that varies the power is further configured to increase the power drawn from the secondary power supply when the power signal is not present at the primary input power connection and the impedance measure is below a predetermined threshold value.

20. A lighting control device according to claim 1, wherein the housing forms at least part of a light bulb enclosure, elongate tube or similar transparent or translucent housing, and/or wherein the housing forms at least part of a power supply unit, a ceiling rose or an inline adapter.

21. A lighting control method using a lighting control device having a housing, the method comprising:
- receiving power from a primary power supply network at a primary input power connection in the housing of the lighting control device;
- receiving power from a secondary power supply at a secondary input power connection in the housing of the lighting control device;
- delivering power to one or more light sources via an output power connection in the housing of the lighting control device; and
- controlling delivery of power from the primary and secondary input power connections to the output power connection to control delivery of power to the one or more light sources using control circuitry in the housing of the lighting control device;
- wherein the controlling comprises:
  - determining an indication of an external electrical loading on the primary power supply network; and
  - varying the power drawn from the primary and secondary input power connections in dependence upon the determined indication of the external electrical loading on the primary power supply network;
- wherein the lighting control device comprises:
- a normal mode of operation in which power from the primary input power connection is delivered to the output power connection for the one or more light sources;
- an economy mode of operation in which no power or minimal power from the primary input power connection is taken and power from the secondary input power connection is delivered to the output power connection for the one or more light sources; and
- a charging mode of operation in which power from the primary input power connection is delivered to the secondary input power connection to charge the secondary power supply;
- wherein the determining determines a frequency measurement of a power signal received at said primary input power connection;
- using the frequency measurement to determine whether there is a high demand, a low demand or a normal demand on the primary power supply network; and
- operating in the charging mode if there is low demand on the primary power supply network; operating in the normal mode if there is normal demand on the primary power supply network; and operating in the economy mode if there is high demand on the primary power supply network.

\* \* \* \* \*